(12) United States Patent
Doig

(10) Patent No.: US 10,757,345 B2
(45) Date of Patent: Aug. 25, 2020

(54) IMAGE CAPTURE APPARATUS

(71) Applicant: Sony Interactive Entertainment Inc., Tokyo (JP)

(72) Inventor: Jason Doig, Biggleswade/Beds (GB)

(73) Assignee: Sony Interactive Entertainment Inc., Tokyo (JP)

( * ) Notice: Subject to any disclaimer, the term of this patent is extended or adjusted under 35 U.S.C. 154(b) by 0 days.

(21) Appl. No.: 15/774,933

(22) PCT Filed: Oct. 17, 2016

(86) PCT No.: PCT/GB2016/053207
§ 371 (c)(1),
(2) Date: May 9, 2018

(87) PCT Pub. No.: WO2017/089741
PCT Pub. Date: Jun. 1, 2017

(65) Prior Publication Data
US 2018/0332234 A1   Nov. 15, 2018

(30) Foreign Application Priority Data

Nov. 27, 2015 (GB) .................................. 1520952.1

(51) Int. Cl.
*H04N 5/247* (2006.01)
*G03B 17/56* (2006.01)
(Continued)

(52) U.S. Cl.
CPC ............. *H04N 5/247* (2013.01); *G02C 5/008* (2013.01); *G03B 17/561* (2013.01); *G03B 37/04* (2013.01);
(Continued)

(58) Field of Classification Search
CPC ........ G02B 27/22; G01C 11/02; H04N 5/247; H04N 5/3415; H04N 13/243;
(Continued)

(56) References Cited

U.S. PATENT DOCUMENTS 6,141,034 A * 10/2000 McCutchen ........... G02B 27/22
348/36
6,356,397 B1 3/2002 Nalwa
(Continued)

FOREIGN PATENT DOCUMENTS

CN 201409204 Y 2/2010
CN 201842029 U 5/2011
(Continued)

OTHER PUBLICATIONS

International Search Report and Written Opinion for corresponding PCT Application No. PCT/GB2016/053207, 14 pages, dated Jan. 2, 2017.
(Continued)

*Primary Examiner* — Tat C Chio
(74) *Attorney, Agent, or Firm* — Matthew B. Dernier, Esq.

(57) ABSTRACT

An image capture apparatus suitable for capturing images for use in generating a virtual reality environment, the apparatus comprising a three-dimensional frame that defines an internal volume and a plurality of cameras arranged on the frame so as to form a three-dimensional array, wherein the cameras are arranged to face inwards towards a part of the internal volume and are arranged to capture images of a scene located outside the internal volume, the images also comprising at least a portion of the internal volume.

15 Claims, 5 Drawing Sheets

(51) Int. Cl.
*G03B 37/04* (2006.01)
*G06F 3/01* (2006.01)
*H04N 5/341* (2011.01)
*G06T 7/33* (2017.01)
*G06T 7/593* (2017.01)
*H04N 13/243* (2018.01)
*G02C 5/00* (2006.01)
*H04N 13/296* (2018.01)

(52) U.S. Cl.
CPC ............... *G06F 3/011* (2013.01); *G06T 7/33* (2017.01); *G06T 7/593* (2017.01); *H04N 5/3415* (2013.01); *H04N 13/243* (2018.05); *H04N 13/296* (2018.05); *G06T 2207/10012* (2013.01)

(58) Field of Classification Search
CPC .. H04N 13/296; H04N 13/282; G03B 17/561; G03B 37/04; G06F 3/011; G02C 5/008; G06T 7/33; G06T 7/593; G06T 2207/10012; G06T 19/006
See application file for complete search history.

(56) References Cited

U.S. PATENT DOCUMENTS

| | | | |
|---|---|---|---|
| 2004/0041914 A1* | 3/2004 | Peters, III | G01C 11/025 348/207.99 |
| 2009/0034086 A1 | 2/2009 | Montgomery | |
| 2014/0146132 A1 | 5/2014 | Bagnato | |
| 2014/0267596 A1* | 9/2014 | Geerds | H04N 5/2252 348/38 |
| 2017/0076429 A1* | 3/2017 | Russell | G06T 3/4038 |

FOREIGN PATENT DOCUMENTS

| | | |
|---|---|---|
| CN | 202652367 U | 1/2013 |
| CN | 202886832 U | 4/2013 |
| CN | 103108111 A | 5/2013 |
| GB | 873118 A | 7/1961 |
| GB | 968103 A | 8/1964 |
| WO | 2004109385 A2 | 12/2014 |
| WO | 2014071400 A1 | 5/2015 |
| WO | 2015085034 A1 | 6/2015 |
| WO | 2015108071 A1 | 7/2015 |

OTHER PUBLICATIONS

Search report for corresponding GB Application No. GB1520952.1, 6 pages, dated May 16, 2016.
NPL document title in non English language, vol. 13, No. 12, pp. 2291-2296 (Dec. 31, 2008) (Citation listed on p. 6 of the Search report for corresponding GB Application No. GB1520952.1, listed above)—Copy Not Available.
First Office Action for corresponding CN Application No. 201680037747.6, 20 pages, dated Mar. 16, 2020.
EP Communication pursuant to Article 93(3) for corresponding EP Application No. 16784268.1, 6 pages, dated Jun. 30, 2020.

* cited by examiner

IMAGE CAPTURE APPARATUS

BACKGROUND OF THE INVENTION

Field of the Invention

This disclosure relates to an image capture apparatus.

Description of the Prior Art

In recent years virtual reality (VR) apparatus and content has become more widespread. This content allows a user to explore an environment via a processing device and an associated screen, for example a head-mountable display (HMD) that may be connected to an entertainment device such as the Sony® PlayStation 4®. In order to provide an immersive experience for the user, it is often desirable to generate a VR environment for the user to be able to explore. As is known in the art, this is a computer-generated environment that may be displayed to a user either monoscopically or stereoscopically for either 2D or 3D viewing respectively. A VR environment may be designed and rendered using appropriate computational tools, generated from a set of images captured of a real environment using cameras, or a combination of the two.

Using environments that have been created using a computer may be advantageous in that a complete environment may be generated; there are likely to be no issues with occlusion of features or features being missing from the environment when the entire environment is well designed. However this method may also be time-consuming and require a large amount of skill to generate a believable, and therefore immersive, environment and as a result it may be preferable to either capture and use scenes of real environments or at least use them as a base upon which to perform image processing to generate an environment.

However, the use of a camera to capture an image of a real environment may provide a different set of problems to consider.

Capturing images for 2D video is a known process in which a camera is positioned at the desired viewpoint with the desired pose, and an image or series of images is captured at this position. In the generation of a VR environment, this approach has many drawbacks; for the entire environment (or even just a portion of the environment) to be captured, images must be captured from a number of viewpoints or poses. The camera or cameras must therefore be repositioned or reoriented in order to capture a sufficient number of images, or a large number of stationary cameras must be used. Image processing must then be applied in order to combine these images and generate a VR environment from them.

One proposed solution to the problems discussed above is to compress multiple cameras into a small volume such that each camera faces outwards from the volume in order to capture the scene around them. This enables images of the environment to be captured for a range of angles at a given position without having to reorient a camera multiple times. This approach is useful for capturing a spherical view from a single viewpoint, but may not be appropriate for all applications as it may be difficult to derive depth data for the environment or generate stereoscopic images of the environment. Further to this, an internal volume is defined by the position of the cameras which is not visible to any of the cameras. It may also be a problem that the compressed nature of the camera arrangement limits the number or size of the cameras that are provided, and as such image quality may have to be sacrificed in order to capture a more useful image.

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

SUMMARY OF THE INVENTION

This disclosure is defined by claims 1 and 8, with further respective aspects and features of the disclosure being defined in the appended claims.

The present disclosure provides an arrangement in which images of an environment may be captured in a manner that is appropriate for VR applications. This is achieved by providing an arrangement comprising a three-dimensional frame that defines an internal volume and a plurality of cameras arranged on the frame so as to form a three-dimensional array, in which the cameras are arranged to face inwards towards a part of the internal volume and are arranged to capture images of a scene located outside the internal volume, the images also comprising at least a portion of the internal volume.

The frame acts as a rig to which a plurality of cameras is affixed, each facing towards the centre of the rig. The rig may comprise a plurality of rods as a frame, with several areas between the rods with no obstruction so as to allow the cameras to capture images of the surrounding environment; this will be discussed in more detail below with reference to FIG. 2. Image processing can then be applied to the multiple images that are captured at a single time so as to remove any undesirable features from the images such as the rig and cameras whilst providing information about the environment obtained from other images in order to fill in any gaps in the images left by the editing out of these features.

It is to be understood that both the foregoing general description of the invention and the following detailed description are exemplary, but are not restrictive, of the invention.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DESCRIPTION OF THE EMBODIMENTS

In the earlier arrangement as described above in which cameras are arranged in an outward-facing manner about a volume, it is apparent that unless there is a very small camera spacing or a very wide field of view the level of overlap between images is very low. As discussed above, this reduces the ability of the arrangement to correctly utilise parallax in order to generate 3D images at a later time or to overcome issues with occlusion of features in the captured images.

The present disclosure alleviates this problem by providing a camera arrangement that provides a greater overlap between images captured by different cameras. An example of this is schematically illustrated in FIG. 1.

Figure 1:
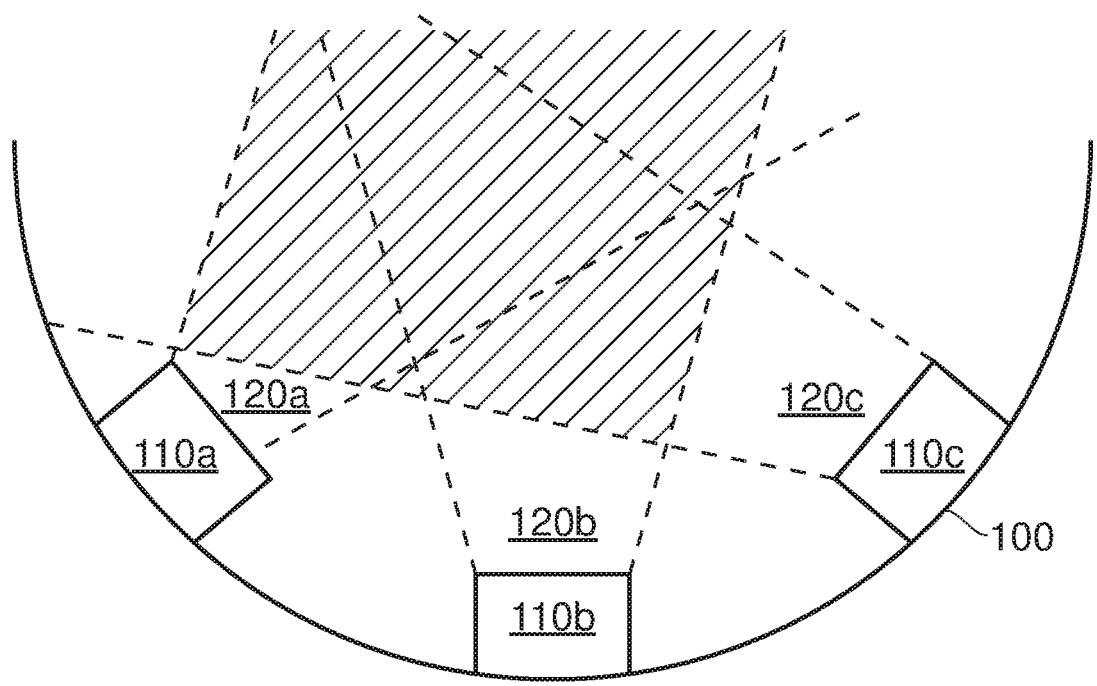
FIG. 1 schematically illustrates a two-dimensional arrangement of cameras.

In FIG. 1, an outer frame 100 is provided upon which three cameras 110a, 110b and 110c are arranged. These cameras have the respective fields of view 120a, 120b and 120c, with areas that appear in multiple fields of view being represented by hatched portions. As is apparent from FIG. 1, only the features closest to each camera appear in only a single camera's field of view; and features are unlikely to be present at such a distance from the camera due to the structure of embodiments of the present disclosure.

Any feature, such as those of the camera arrangement, that does appear in the field of view of a camera will cause an occlusion of further features behind it. This can cause problems in image capturing arrangements as this prevents images of the compete environment from being captured. This is alleviated by the arrangement of FIG. 1 however, as when a feature appears in the field of view of multiple cameras with different viewpoints a different set of features is occluded for each viewpoint. This enables image processing to be performed to combine the appropriate images (or parts thereof) in order to construct a more complete view of the environment in areas that are occluded.

The use of overlapping images to alleviate the problems associated with occlusion enables the extension of the arrangement of FIG. 1 into three dimensions. Although any polyhedron or other three-dimensional shape that defines an internal volume may be suitable for such an arrangement, with reference to FIG. 2 the example of a regular dodecahedron is considered.

Figure 2:
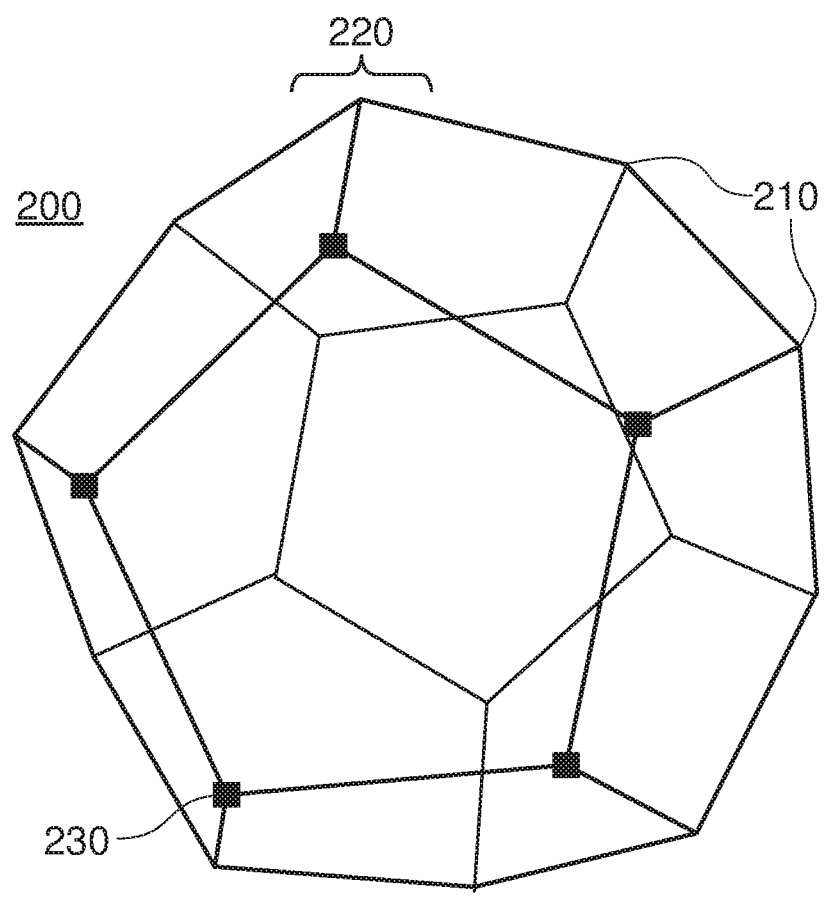
FIG. 2 schematically illustrates a camera arrangement.

FIG. 2 shows a regular dodecahedron 200, and it is considered that the sides of the shape are not present so as to allow cameras to see the environment outside of the polyhedron; the regular dodecahedron 200 is therefore defined by the vertices 210 and edges 220. Cameras 230 are affixed to the dodecahedron 200 so as to face inwards towards a part of the internal volume defined by the dodecahedron 200. The cameras 230 are arranged to capture images of a scene located outside the internal volume, although the images will also comprise at least a portion of the internal volume.

Cameras may be affixed to the vertices of a polyhedral frame, as is exemplified by FIG. 2, or they may be affixed to the frame on the edges, away from the vertices. The cameras may be distributed at regular intervals, for example having a camera at every vertex or every other vertex, or they may be distributed with no apparent pattern. It should also be noted that any of a number of orientations of the cameras could be used, such as each camera being directed towards the centre of the volume defined by frame, and the cameras may each be directed to the same point in the internal volume or they may have orientations that differ from one another. The cameras may also be configured to be reoriented relative to the frame; an example of this is a camera that is mounted upon a motor which may be controlled to change to orientation of the camera.

The type of camera that is used may vary depending on the requirements of the user; for example the cameras could be stereoscopic cameras suitable for providing depth information for features in a captured image, or wide-angle lenses could be supplied to a camera in order to capture images with a wider field of view than when using a standard lens.

Figure 3:
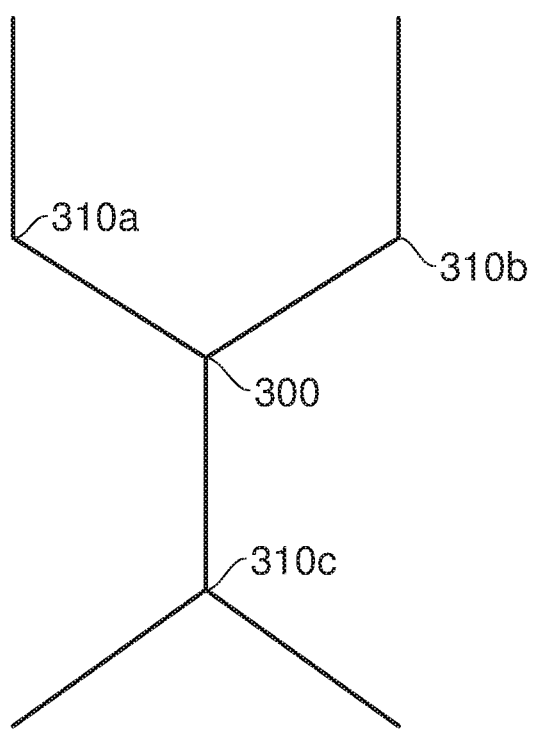
FIG. 3 schematically illustrates an image captured by a camera.

FIG. 3 schematically illustrates a portion of the view that is captured by a camera, showing only the frame of the polyhedron to which the cameras are affixed to maintain clarity; it would of course be understood by the skilled person that the environment that is within the field of view of the camera would also be captured where not occluded by the frame of the dodecahedron.

The amount of occlusion that is experienced by each camera is dependent on the size of the dodecahedral frame (both in terms of the structural size and the thickness of the elements used to form the frame) as well as the orientation of the cameras; for example, each camera could be arranged so as to face a direction in which there is no frame in the field of view.

Considering the viewpoint schematically illustrated in FIG. 3, it is apparent that the centre 300 of the viewpoint is occluded by a vertex of the frame which may or may not support a camera. If a camera were positioned at every vertex of the frame, then a camera would also be centred upon each of the vertices 310a, 310b and 310c. Due to the separation of the cameras that are centred on these points, each will have different features occluded by the frames. This means that by using one or more other images captured by these cameras it is possible to eliminate the frame from a generated composite image. Further cameras are centred upon further respective vertices of the frame, which provides a greater separation of the cameras (by selecting a camera that is further away to provide an image to complement the current image) and therefore may also be useful in contributing to a generated composite image.

Figure 4A:
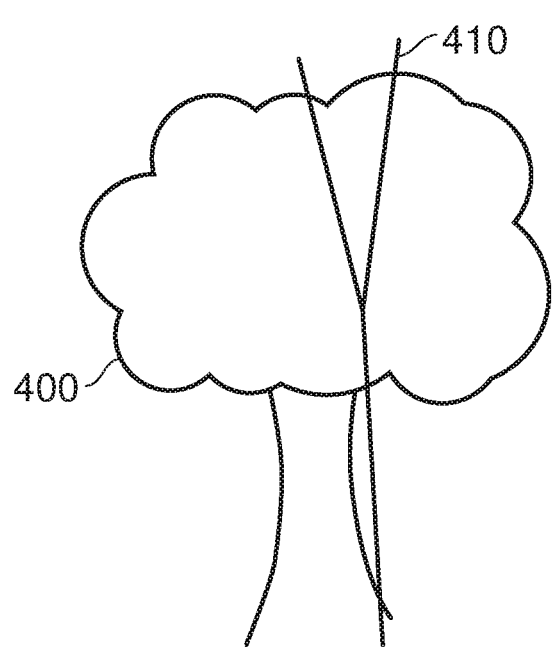
FIGS. 4*a* and 4*b* schematically illustrate images captured by a pair of cameras.
Figure 4B:
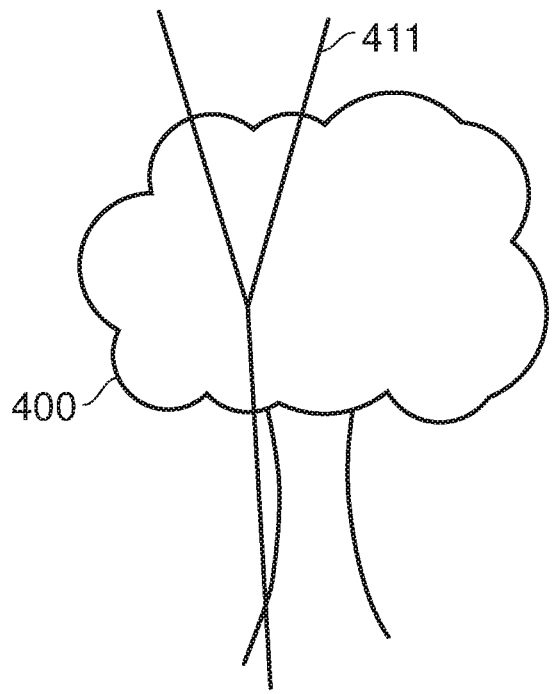

FIGS. 4a and 4b schematically illustrate examples of images captured by two cameras that are in proximity to one another. Each of these shows an image feature 400, with respective occlusions 410 and 411. These images may be referred to as complementary images, as they each provide an image of a single feature and therefore may be used together to generate information about the feature. The occlusions represent objects, such as the frame that supports the cameras, which prevent a camera from obtaining a complete image of the environment.

Figure 4C:
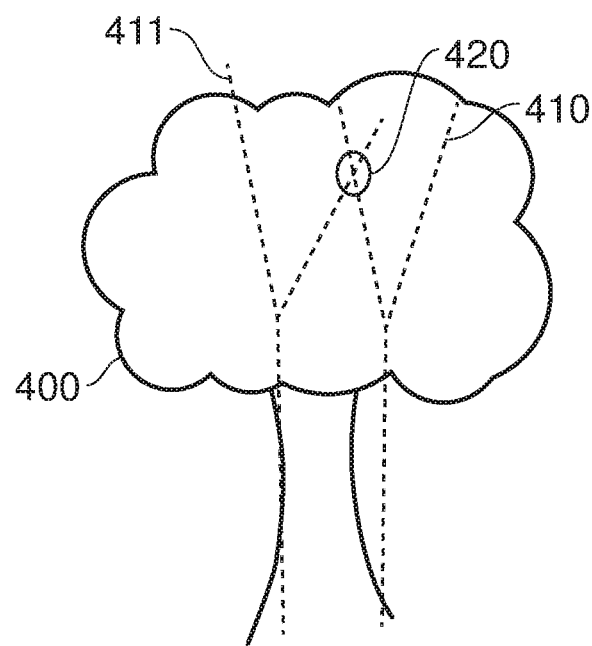
FIG. 4*c* schematically illustrates a composite image generated from captured images.

FIG. 4c represents a composite image formed from the complementary images of FIGS. 4a and 4b. In this image, the occlusions 410 and 411 have been removed as the missing portions of the feature in each image may be supplemented with image data from the other image. The exception is at the intersection 420 of the occlusions, at which neither image has captured an image of the feature. This intersection may be known as a blind spot. If this blind spot is sufficiently small, then this may be acceptable to the viewer (especially if the environment is displayed at a lower resolution than it is imaged, as the feature may appear insignificant); alternatively, further images may be used to supplement this image with further image data to eliminate any blind spots from the composite image. In other embodiments, further cameras may be provided on the outside of the frame at the vertices in order to capture images that would have otherwise contained blind spots.

Alternatively, or in addition, known error adjusting techniques may be used to fill in the intersection with image data taken from the surrounding area of the composite image. It is also envisaged that an arrangement may be provided with cameras facing away from the internal volume, arranged about the external surface of the frame. The images obtained by these cameras may be used to supplement the images captured by the inwards-facing cameras in order to further mitigate the problem of blind spots being present in the generated VR environment.

The process of combining a plurality of images to form a composite image with a reduced problem with occlusion may be improved by noting the relative positions and orientations of the cameras that are provided in the arrangement. Measurements of the position and orientation of the cameras may be performed as part of the manufacturing process if the cameras are fixed, or may be detected using any other positioning technique such as the use of fiduciary markings on the frame.

Such techniques may allow for the information to be provided to a processor prior to the image processing, or vastly simplify the image processing required to map the cameras. As a result, the computational burden of generating a VR environment is reduced and (as may be important in the context of a live broadcast of the images that are captured) the process is expedited.

Figure 5:
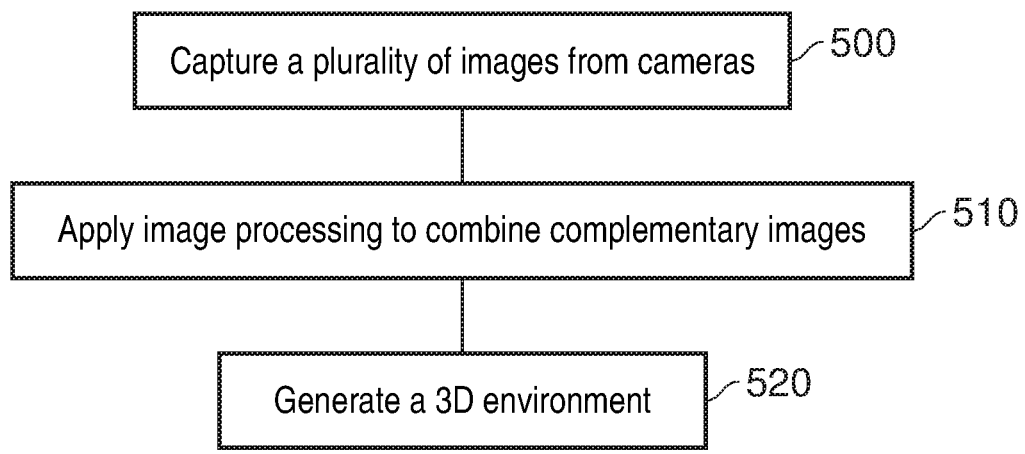
FIG. 5 schematically illustrates a VR environment generation process.

FIG. 5 schematically illustrates a process by which a VR environment may be generated using the presently disclosed arrangement. At a step 500 images are captured using the camera arrangement, and these images are processed at a step 510 in order to remove undesirable occluding features. In a final step 520, a VR environment is generated using the processed images. Each of these steps is described in more detail below.

The step 500 comprises the capturing of a plurality of images from cameras that are arranged in a three-dimensional array upon a frame, wherein the cameras are arranged to face inwards towards a part of the internal volume and are arranged to capture images of a scene located outside the internal volume, the images also comprising at least a portion of the internal volume. Many of these images, due to the orientation of the cameras, will comprise images of other cameras and the frame of the apparatus which are considered undesirable.

Step 510 addresses or mitigates this by applying image processing to combine complementary images from the captured images to generate a set of images. The processed images may be stored in the form of a single composite image of the environment, or a number of composite images may be generated, or alternatively each image may be stored individually depending on the preferences of the user of the apparatus. These images may be stored with associated metadata, such as depth information for different image regions or location/orientation information for the camera at the time of capturing the image.

At the step 520, further processing is applied to the images in generating a virtual reality environment using the generated set of images. This processing may incorporate the use of any metadata associated with the images or analysis of the generated set of images. For example, the generated images or metadata associated with the generated images are processed to obtain depth information about image features. This environment may be stored in any suitable format, such as a map of features or an image (or images) with associated metadata that allows the image to be interpreted as a virtual reality environment.

For example, taking the centre of the apparatus as a notional origin, in a first instance the composite image is projected onto a sphere, cylinder, cube, or other volume for use in a virtual environment. For example, this could be implemented with the composite image being applied as a distant backdrop. In a second instance, depth data is combined with the composite image data to produce a map in a virtual space of image pixel positions, which may be presented in Cartesian form (x, y, z coordinates) or as polar coordinates (for example, spherical polar coordinates r, $\theta$, $\varphi$). Such a map could then be used to form a mesh or textures, which may be useful for future image processing for example.

It would be apparent to the skilled person that this method may be implemented using computer software which when executed by a computer, causes a computer to perform the above method. Such a computer program is stored upon a non-transitory machine-readable storage medium that may be present in a hardware arrangement as described below with reference to the system of FIG. 6.

Figure 6:
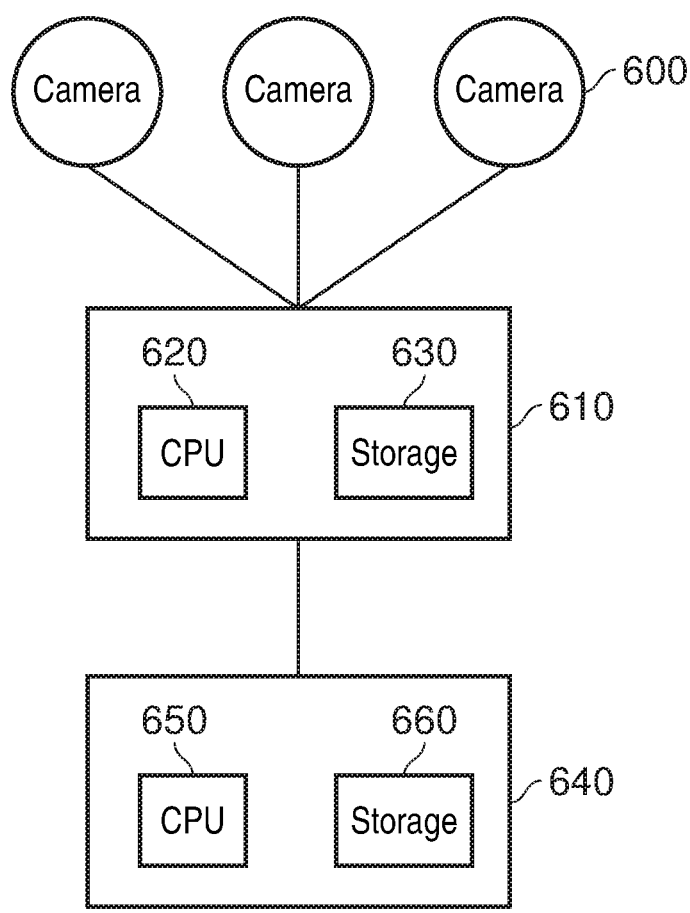
FIG. 6 schematically illustrates a VR environment generation system.

FIG. 6 schematically illustrates a system for generating a VR environment from captured images. A camera arrangement 600 as described above provides an input to a storage device 610. The storage device 610 comprises at least a processor 620 and storage 630 for storing the images and any associated metadata. The storage device 610 may also be mounted to the frame of the camera arrangement, or it may receive the inputs from the cameras via a wired or wireless connection. Alternatively, the storage device 610 may not be present in the system and the image data from the cameras may be transmitted directly to the processing device 640. The processing device 640 comprises a processor 650 and a memory 660 which is operable to store image data, any associated metadata and application data used to combine complementary images and subsequently generate the VR environment from the images.

The foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, defines, in part, the scope of the foregoing claim terminology such that no inventive subject matter is dedicated to the public.

The invention claimed is:

1. An image capture apparatus suitable for capturing images for use in generating a virtual reality environment, the apparatus comprising:
   a three-dimensional frame that defines an internal volume; and
   a plurality of cameras arranged on the frame so as to form a three-dimensional array;
   wherein the cameras are arranged to face inwards towards a part of the internal volume and are arranged to capture images of a scene located outside the internal volume, the images also comprising at least a portion of the internal volume and the frame, and
   wherein the plurality of cameras are arranged such that complementary images are captured, wherein complementary images are images that each comprise a same image feature.

2. An apparatus according to claim 1, wherein the frame defines a polyhedral volume as the internal volume.

3. An apparatus according to claim 1, wherein the cameras are located at vertices of the frame.

4. An apparatus according to claim 1, wherein the cameras are directed towards a centre of the internal volume defined by frame.

5. An apparatus according to claim 1, wherein the cameras are arranged at regular intervals on the frame.

6. An apparatus according to claim 1, wherein the cameras are configured to be reoriented relative to the frame.

7. An apparatus according to claim 1, wherein the cameras are stereoscopic cameras.

8. The image capture apparatus of claim 1, wherein the images include the at least a portion of the internal volume, at least a portion of frame, and at least a portion of one or more of the plurality of cameras.

9. A virtual reality environment generation method comprising:
- capturing a plurality of images from cameras that are arranged in a three-dimensional array upon a frame, wherein the cameras are arranged to face inwards towards a part of an internal volume formed by the frame, and are arranged to capture images of a scene located outside the internal volume, the images also comprising at least a portion of the internal volume and the frame;
- applying image processing to combine complementary images from the captured plurality of images to generate a set of images, wherein complementary images are images that each comprise a same image feature; and
- generating a virtual reality environment using the generated set of images.

10. A method according to claim 9, wherein the complementary images are combined so as to generate a combined image that does not include images of other cameras.

11. A method according to claim 9, wherein the complementary images are combined so as to generate a combined image that does not include images of the frame.

12. A method according to claim 9, wherein the generated images or metadata associated with the generated images are processed to obtain depth information about image features.

13. A method according to claim 9, wherein the virtual reality environment is generated by projecting combined images onto a volume.

14. A method according to claim 9, wherein the virtual reality environment is generated by combining combined images with depth data to produce a map of image pixel positions.

15. A non-transitory computer-readable storage medium which stores computer software, which when executed by a computer, causes the computer to carry out actions, comprising:
- capturing a plurality of images from cameras that are arranged in a three-dimensional array upon a frame, wherein the cameras are arranged to face inwards towards a part of an internal volume formed by the frame, and are arranged to capture images of a scene located outside the internal volume, the images also comprising at least a portion of the internal volume and the frame;
- applying image processing to combine complementary images from the captured plurality of images to generate a set of images, wherein complementary images are images that each comprise a same image feature; and
- generating a virtual reality environment using the generated set of images.

* * * * *